Oct. 24, 1944.  W. H. SILVER  2,361,326
POWER LIFT
Filed July 15, 1942
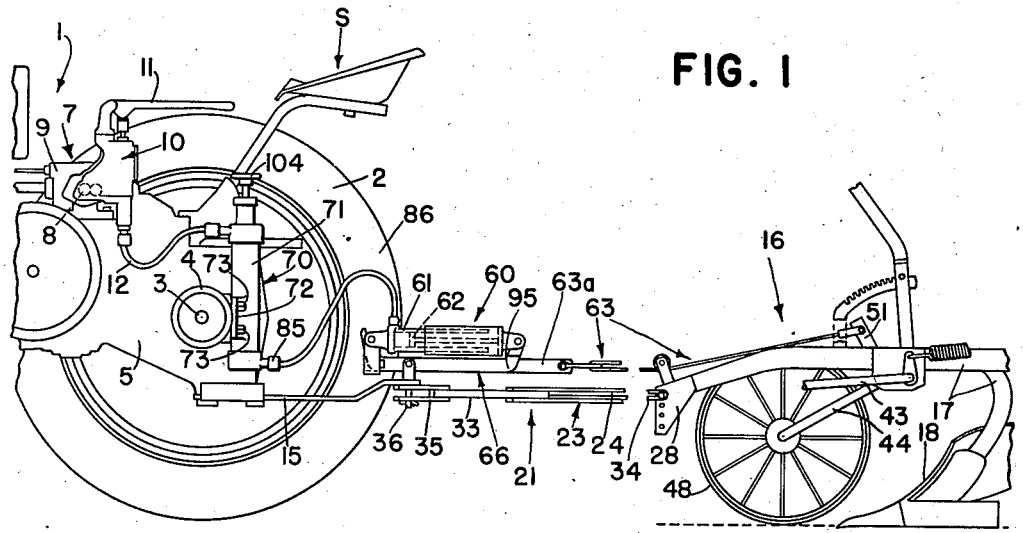
FIG. 1
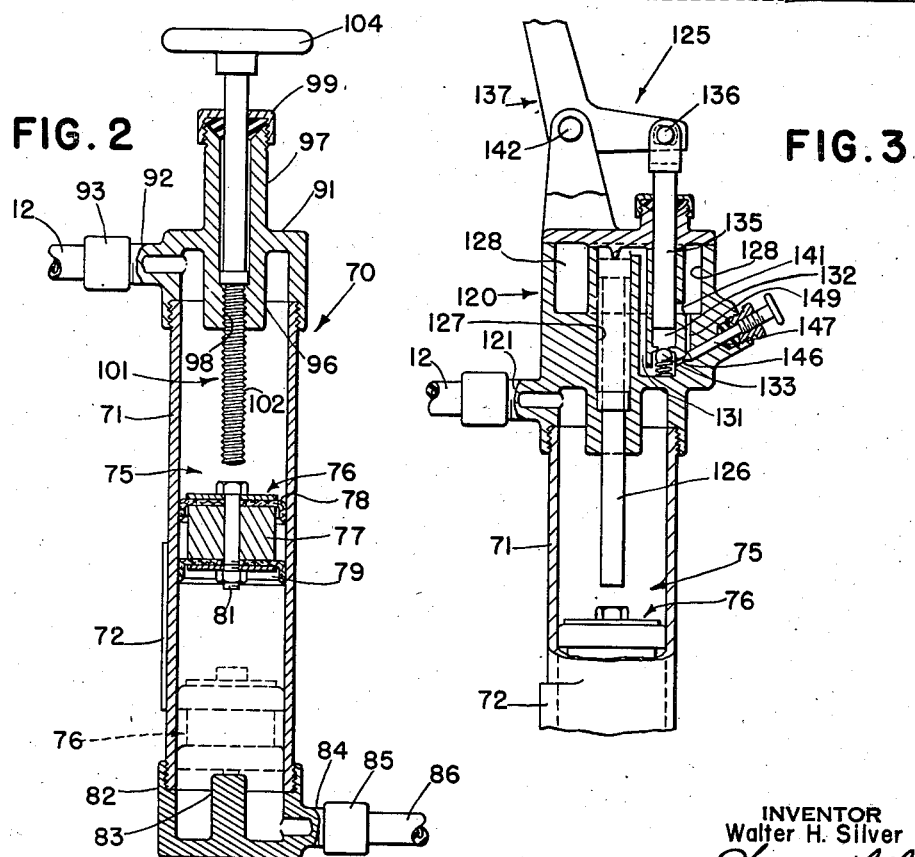
FIG. 2
FIG. 3
INVENTOR
Walter H. Silver
BY
ATTORNEYS Patented Oct. 24, 1944

2,361,326

UNITED STATES PATENT OFFICE 2,361,326

POWER LIFT

Walter H. Silver, Moline, Ill., assignor to Deere & Company, Moline, Ill., a corporation of Illinois Application July 15, 1942, Serial No. 451,067

5 Claims. (Cl. 97—50)

The present invention relates generally to agricultural implements and more particularly to power operated means for controlling the position of adjustable parts on the implement.

The object and general nature of the present invention is the provision of a tractor-propelled implement having means to be adjusted, such as the tool or tools to be raised and lowered, with hydraulic mechanism connected to adjust said adjustable means including conveniently operated means on the tractor for limiting the movement of the implement adjusting means. More specifically, it is a feature of this invention to provide a source of pressure on the tractor and a hydraulic ram unit on the implement, with intermediate hydraulic means including a free piston, the movement of which is limited by adjustable stop means whereby to limit the operation of the ram unit on the implement.

Another feature of this invention is the provision of a hydraulic system including a pair of serially connected piston and cylinder units with means acting against the piston of one unit for controlling the movement or operation of the other unit. Another feature of this invention is the provision of interconnected hydraulic units, one adapted to be mounted on the tractor and the other on the implement, with a flexible connection therebetween and with means associated with the unit on the tractor for controlling the movement of the unit on the implement. Still further, another featutre of this invention is the provision of a hydraulic ram unit on an implement for adjusting one or more of the parts of the latter, with means for operating the ram unit including a substantially constant volume of fluid serving as an operating connection between a source of power and the ram unit, and a further feature of this invention is the provision of means for replenishing the confined body of fluid so as to maintain the same substantially constant.

These and other objects and advantages of the present invention will be apparent to those skilled in the art after a consideration of the following detailed description of the preferred structural embodiment illustrated in the accompanying drawing.

In the drawing:

Figure 1 is a side view of a tractor-propelled plow, in which the principles of the present invention have been incorporated;

Figure 2 is a fragmentary enlarged vertical section taken through the metering chamber; and Figure 3 illustrates a modified form of adjusting means for limiting the movement of the free piston in the metering chamber.

Referring now to the drawing, particularly Figure 1, the reference numeral 1 indicates a tractor which is more or less of conventional construction and hence has been illustrated only fragmentarily. The tractor 1 includes rear drive wheels 2 fixed to drive axles 3 that are journaled for rotation in a rear axle housing 4. The latter is secured to or forms a part of a transmission housing 5. The tractor 1 is equipped with a controlled source of fluid pressure, indicated in its entirety by the reference numeral 7 and which comprises a fluid pump 8 driven from the shaft of the tractor governor 9 and suitable controlling valve mechanism 10 which is actuated by a valve lever 11. A fluid conduit in the form of a flexible hose connection 12 extends from the power unit 7 to a point of utilization to which reference will be made in more detail below. The present invention is not especially concerned with the particular details of the power unit 7, the same being preferably of the same construction as shown in the co-pending application of Jay D. Johnson, Serial No. 398,539, filed June 18, 1941, to which reference may be made if necessary, and therefore further description of the hydraulic unit on the tractor 1 is unnecessary except to point out that moving the valve lever 11 upwardly causes fluid to be forced outwardly through the conduit 12 under pressure and returning the lever 11 to neutral locks the fluid in the conduit 12 and associated connections. Depressing the lever 11 permits fluid to flow freely back into the power unit 7 from the hose connection 12 and the associated unit or units.

The tractor 1 is provided with a drawbar 15 to which an agricultural implement, such as a tractor-propelled plow 16, may be connected. While the present invention is not necessarily limited to tractor-propelled plows, this type of implement has been chosen so as best to indicate the principles and operation of the present invention.

The plow 16 as illustrated is of the two-bottom towed type and includes a pair of plow beams 17 to the lower rear ends of which plow bottoms 18 are connected in the usual way. The forward ends of the plow beams 17 are connected to a vertical swingable hitch, indicated in its entirety by the reference numeral 21, which includes a longitudinal draft member 23 and a diagonal brace 24, to the rear ends of both of which a transverse bar is connected. Draft brackets 28 are connected to the forward ends of the plow beams 17 and are connected respectively by clevises 31 to the rear portion of the swingable hitch 21. A drawbar extension 33 is bolted to the longitudinal member 23 and at its forward end receives a clevis 34 that is connected to the drawbar 15 of the tractor by a pivot pin 36.

A pair of crank axles 43 and 44 are journaled for rocking movement in brackets fixed to the plow beams 17 and each crank axles includes a laterally turned end upon which a ground wheel, one of which is shown at 48, is mounted. The crank axles 43 and 44 are interconnected by suitable means so that they swing together, and an arm 51 is fixed so that by swinging the arm both crank axles 43 and 44 are swung upwardly or downwardly so as to raise or lower the plow bottoms 18.

The arms 51 and associated crank axles 43 and 44 and other parts, which form a part of the implement 16, therefore forms implement means that is adapted to be adjusted, and the adjustment of such means is effected by means of a ram or cylinder and piston unit indicated in its entirety by the reference numeral 60. The unit 60, together with the other details of the implement and hitch, is shown and claimed in the co-pending application, Serial No. 427,541, filed January 21, 1942, by Frank T. Court, and a reference to this application may be made if desired for a more detailed description of the parts. So far as the present invention is concerned, it is sufficient to say that the ram unit 60 includes a cylinder 61 and a piston 62, the latter being connected by linkage 63 with the arm 51. The unit 60 is supported on the pivot pin 36 by a carrier indicated in its entirety by the reference numeral 66. As best shown in said co-pending application, the carrier 66 releasably supports the unit 60 so that in the event the pin 36 breaks the unit 60 is pulled away from the carrier 66 and out of connection with the linkage 63 automatically.

Coming now to the feature with which the present invention is more particularly concerned, a cylinder and piston unit 70 is supported stationarily on the tractor 1 in any suitable manner, the cylinder 71, in the preferred form, being provided with attaching ears 72 which are apertured to receive bolts or cap screws 73 for securing the cylinder 71 to the rear axle housing 4, as best shown in Figure 1. The cylinder 71 forms a metering chamber 75 in which a free piston 76 is movable. The piston 76, as best shown in Figure 2, comprises a supporting member 77 having a pair of leather cups 78 and 79 fastened by bolt means 81 to the upper and lower side of the support 77, with the lips of the leathers extending downwardly, as shown. The lower end of the cylinder 71 is provided with a closure 82 in which an upwardly extending stop 83 is disposed, the member 82 having a bored extension 84 which is threaded to receive the connection 85 at the forward end of a flexible hose section 86. The rear end of the hose 86 is connected in any suitable manner with the cylinder 61. The upper end of the cylinder 71 carries a closure 91 which is provided with a similar bored extension 92 threaded to receive the rear connection 93 that forms a part of the high pressure hose 12 leading from the pressure unit 7 (Figure 1).

The upper closure 91 is provided with inner and outer tubular extensions 96 and 97, the former being threaded, as at 98, and the upper end of the latter receiving a packing gland 99. An adjustable stop member 101 is disposed within the tubular extensions 96 and 97 and at its lower end is threaded, as at 102, and at its upper end passes through the packing gland 99 and receives a hand wheel 104 or other means by which the member 101 may be manipulated from the tractor seat S (Figure 1).

The operation of the mechanism so far described is substantially as follows.

When the valve handle 11 is raised, fluid under pressure flows through the hose 10 into the upper end of the metering chamber 75. The operation of the pump 8 which is driven by the tractor motor therefore serves to force the free piston 76 downwardly. It will be understood that oil or other substantially incompressible fluid fills the cylinder 61 in front of the piston 62, the hose 86, the lower end of the metering chamber 75 below the piston 76, and the upper end of the metering chamber 75 and the hose 12. The downward movement of the free piston 76 therefore forces an amount of oil rearwardly through the hose 86, acting against the piston 62 to extend the ram unit 60 on the implement 16. In the modification shown, the piston 62 is anchored to a fixed part 95 of the carrier 66 while the cylinder 61 is connected at its forward end with a movable part of the carrier 66, that part being the member indicated at 63a that is connected to and forms a part of the linkage 63. The forward movement of the cylinder 61 therefore results in swinging the arm 51 forwardly and raising the plows 18 by swinging the crank axles 43 and 44 in a direction to raise the beams 17. As described above, the valve mechanism 10 is so arranged that when the lever 11 is returned to its neutral position fluid is hydraulically locked in the system, including the hose 12 and the upper portion of the metering chamber 75. Since fluid is locked in this portion of the apparatus, it will be seen that the piston 62 will be held in its rearward position, relative to the cylinder 61, with the free piston 76 in a lower position in its cylinder 71, such as is indicated in dotted lines in Figure 2, since it is the custom to raise the tools to the maximum raised position when transporting the implement.

The implement tools may be lowered by depressing the valve handle 11, which releases the locked fluid in the upper portion of the metering chamber 75, whereupon the free piston 76 is free to move upwardly as oil flows back through the unit 7. This permits the piston 62 to move forwardly within its cylinder 61, thus permitting the implement frame to lower. The movement of the tools in this direction is limited by the free piston 76 engaging the lower end of the stop member 101, which may be turned to project its lower or inner end to a greater or lesser extent within the metering chamber 75. When the piston 76 engages the pin 101, its movement is terminated, and since the piston 76 is no longer free to move, the other piston 62 is likewise held in a hydraulically locked position. Thus, the position of the adjustable stop member 101 serves to adjust the position of the implement tools. It may therefore be considered that the raising and lowering of the tools is effected by the transmission of the force to a first movable wall, i. e., the piston 76, which movement is transmitted by a combined body of substantially incompressible fluid of substantially constant volume to another movable wall, i. e., the piston 62, movement of which controls the tools, as described above.

It may occur, through linkage and the like, that the above-mentioned confined body of substantially incompressible fluid of substantially constant volume may be reduced in quantity so that when the free piston 76 is forced to the lower end of the cylinder 71 the tools are not in their fully raised position as desired. The present invention contemplates means for automatically replenishing any such loss of fluid from the confined body of fluid, and this occurs by virtue of the leathers 78 and 79 having their lips or flanges turned in a direction to permit a flow of additional fluid past the leathers and into the confined body of fluid. This may be accomplished by holding the valve 11 in its operating or pumping position after the piston 76 engages the stop 83. Such operation of the pump then in forcing fluid into the upper portion of the metering chamber 75 forces an equal amount past the leathers into the lower portion of the metering chamber, thus replenishing any loss. The leathers thus act as one-way valves, since being disposed in the position shown flow of fluid upwardly past the piston 76 is prevented. Thus I have provided in a hydraulic system a convenient way for adjusting the lowered positions of the tool without in any way affecting the action of the hydraulic mechanism in raising the tools to their fully raised position, entirely independent of whether or not the tools were adjusted for shallow or deep operation.

In the preferred construction, turning the hand wheel 104 in one direction or the other adjusts the pin 101 to vary the position at which the free piston 76 will be stopped in its upward movement in the cylinder 71. While in operating position, it is a simple matter to unscrew the member 101 to permit the piston 76 to move upward a slight amount, thus permitting the tools to lower a correspondingly slight amount. However, in order to provide for more shallow operation, the pin 101 would have to be rotated in the other direction, which means that the operator would have to turn the hand wheel 104 against the weight of the tools and other parts. In the larger outfits, this may be inconvenient or difficult, and therefore in order to provide a convenient way for adjusting the free piston stop in either direction, either for more shallow plowing or for deeper plowing, the construction shown in Figure 3 may be substituted for the hand wheel and adjusting pin shown in Figure 2.

Referring now to Figure 3, secured to the upper end of the cylinder 71, in lieu of the closure 91, is a combined closure and pump housing indicated in its entirety by the reference numeral 120. The member 120 is provided with a bored extension 121 which communicates with the upper end of the metering chamber 75 and receives the high pressure hose 12 in the same manner as is shown in Figures 1 and 2. The pump housing 120 forms a part of an adjusting hydraulic unit indicated in its entirety by the reference numeral 125. The unit 125 includes a stop member 126 the upper headed end of which serves as a piston that is movable within a small cylinder 127 formed in the pump housing 120. The latter also includes a reservoir 128, and the upper end of the cylinder 127 communicates by means of a passage 131 with the lower end of a pump bore 132 past a check valve 133. Movable within the pump bore 132 is a pump plunger 135, the upper end of which passes out of the housing 120 and is connected, as at 136, with an operating lever 137. The upper end of the lever 137 is disposed adjacent the operator's station S on the tractor when the cylinder 71 is secured to the tractor in the same way as is shown in Figure 1. The reservoir 128 is adapted to contain a supply of fluid and communicates through a small opening 141 with the upper portion of the pump bore 132. In operation, the handle 137 is adapted to be operated, as by swinging the same in a counterclockwise direction about its supporting pivot 142, until the lower end of the pump plunger 135 passes upwardly beyond the opening 141. Fluid then flows into the lower end of the pump bore 132, whereupon swinging the handle 137 in the other direction forces the pump plunger 135 downwardly, thus forcing oil past the check valve 133 and up the bore 131 into the adjusting pin cylinder 127. The adjusting pin 126 is therefore forced downwardly, as from its uppermost or dotted line position (Figure 3) an amount that depends upon the number of strokes given to the handle 137. The lower end of the pin 126 constitutes a stop limiting the upward movement of the free piston 76 in substantially the same manner as the adjusting member 101 shown in Figure 2.

When it is desired, in the construction shown in Figure 3, to raise the lower end of the stop member 126, the valve lever 11 is moved downwardly so as to lower the tools until the piston 76 comes up against the lower end of the member 126. The check valve 133 prevents any outward movement of the liquid into the pump bore 132, but the housing 120 is provided with a relief passage 146 which is controlled by a needle valve 147. Opening the needle valve 147 therefore permits a flow of fluid from above the upper end of the cylinder 127 and into the reservoir through a second relief passage 149. In the construction shown in Figure 3, due to its hydraulic nature, it is a relatively simple matter to force the adjustable member 126 downwardly, even through it results in manually raising the tools a slight amount.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a tractor propelled implement adapted to be connected with a tractor having a motor, an operator's station on the tractor, and a source of fluid pressure driven by the tractor motor, the combination of a cylinder adapted to be mounted on the tractor adjacent the operator's station and connected with said source of fluid pressure, a free piston movably mounted in said cylinder, a ram unit adapted to be mounted on said implement and hydraulically connected with said cylinder, said cylinder having a volumetric capacity at least equal to the capacity of the cylinder of said ram unit whereby movement of said free piston in the cylinder through a single stroke operates the piston of said ram unit through a full stroke, means for controlling the flow of fluid under pressure to and from said source and said cylinder for shifting said free piston so as to shift said ram piston, and means for limiting the stroke of said free piston, said means being accessible to an operator at said operator's station, so as to limit the stroke of the piston of the ram unit on said implement.

2. In an agricultural implement, the combination of a tractor, a source of fluid pressure thereon, an implement connected to the tractor for movement relative thereto and having a part to be raised, a single action ram unit mounted on said implement and including a movable element connected with said part for raising the latter when fluid under pressure is delivered to the cylinder of said ram unit to extend the same, a second cylinder mounted on the tractor and having a volumetric capacity at least equal to the volumetric capacity of said ram unit, a free piston movably mounted in said second cylinder, the ends of said last mentioned cylinder being closed, a line leading from one end of said last mentioned cylinder to the cylinder of said ram unit, whereby movement of said free piston toward said one end of the associated cylinder forces fluid into said ram cylinder and is capable by one stroke of the piston thereof to raise said implement part through its full range, controlling valve means on the tractor for causing fluid to flow from said source of fluid pressure into the other end of said second cylinder to move said free piston to said one end of the second cylinder and for causing fluid to flow out of said ram cylinder to permit said free piston to move toward the other end of said second cylinder so as to lower said implement part through its full range, and an adjustable stop adapted to be abutted by said free piston when moving toward said other end of the second cylinder to limit the extent of lowering movement of said implement part.

3. In an agricultural implement, the combination of a tractor, a source of fluid pressure thereon, an implement connected to the tractor for movement relative thereto and having a part to be raised, a single action ram unit mounted on said implement and including a movable element connected with said part for raising the latter when fluid under pressure is delivered to the cylinder of said ram unit to extend the same, a second cylinder mounted on the tractor and having a free piston movably mounted therein, a line leading from one end of said last mentioned cylinder to the cylinder of said ram unit, whereby movement of said free piston toward said one end of the associated cylinder forces fluid into said ram cylinder and acts by relative movement of the piston thereof to raise said implement part, controlling valve means for causing fluid to flow from said source of fluid pressure into the other end of said second cylinder to move said free piston to said one end of the second cylinder and for causing fluid to flow out of said ram cylinder to permit said free piston to move toward the other end of said second cylinder so as to lower said implement part, and an adjustable stop adapted to be abutted by said free piston when moving toward said other end of the second cylinder to limit the extent of lowering movement of said implement part, said adjustable stop comprising a plunger extending into said other end of said second cylinder and a hydraulic pump for moving said plunger inwardly.

4. A metering cylinder for an agricultural ram unit, comprising a chamber, a free piston therein, a stop at each end extending generally axially inwardly, and means for adjusting the position of one of said stops, said adjusting means comprising a hydraulically actuated plunger, and release valve means therefor at the upper end of said cylinder.

5. In a tractor propelled implement adapted to be connected with a tractor having a motor, an operator's station on the tractor, and a source of fluid pressure driven by the tractor motor, the combination of a cylinder connected with said source of fluid pressure, a free piston movably mounted in said cylinder, a ram unit adapted to be mounted on said implement and hydraulically connected with said cylinder, said cylinder having a volumetric capacity at least equal to the capacity of the cylinder of said ram unit whereby movement of said free piston in the cylinder through a single stroke operates the piston of said ram unit through a full stroke, means for controlling the flow of fluid under pressure to and from said source and said cylinder for shifting said free piston so as to shift said ram piston, and means disposed in a position accessible to an operator at said operator's station for limiting the stroke of said free piston so as to limit the stroke of the piston of the ram unit on said implement.

WALTER H. SILVER.